May 13, 1941. L. I. KAHN Re. 21,800

VENETIAN BLIND

Original Filed April 10, 1937

INVENTOR.
Lewis I. Kahn.

BY

Paul Klein
his Attorney.

Reissued May 13, 1941

Re. 21,800

UNITED STATES PATENT OFFICE 21,800

VENETIAN BLIND

Lewis I. Kahn, Brooklyn, N. Y.

Original No. 2,123,010, dated July 5, 1938, Serial No. 136,221, April 10, 1937. Application for reissue July 29, 1939, Serial No. 288,158

2 Claims. (Cl. 156—17)

This invention broadly relates to Venetian blinds, and especially pertains to the art of surfacing exposed parts of Venetian blinds such as their slats, top and tilting rails.

One of the objects of the present invention is to provide a Venetian blind structure having the usual major characteristics of that type of shades or shutters, with the exception that the exposed surfaces of the slats and rails are attractively covered by means of a relatively inexpensive, but highly serviceable, moisture-proof, originally pliable, sheeting which, when applied to a relatively infirm, inexpensive base in accordance with my method, will harden and provide, in addition to exterior ornamental effects, an appreciable reinforcement for such base in the different parts of the blind structure, and especially for the slats, which, due to their constant exposure to the elements are vulnerable and subject to sagging and distortion.

A further object of this invention is to provide a highly attractive, expensive-appearing, well made Venetian blind structures from rather inexpensive and even cheap materials, and which structures possess the sturdiness and durability usually expected in most costly blinds of this type.

Another object of the invention is to provide a shutter for Venetian blinds wherein a covering of cloth, paper, or the like is provided, and positioned on the base so as to present a substantially integral appearing article.

In order to meet the ever increasing trend towards incorporating beauty, good taste and aesthetic appearance in usually serviceably, but often clumsily unattractive articles of everyday use in homes and offices, attempts have been made in the art of manufacturing Venetian blinds to enhance their eye appeal by various methods. In a great number of instances such attempts resulted in the production of blinds which were either prohibitive in cost, or too massive and too heavy for practical use; some would have the tendency of breaking and others would sag, warp or twist and are rendered inoperative due to their light, flimsy construction.

In most of the recent developments, either translucent blinds or blinds of different color schemes were employed, in that both the rails and slats were either coated with paints, lacquer or other coloring materials of varying hues, or were decorated by numerously applied ornamental strips. All such decorative matter must be applied manually and requires skill and time. Consequently blinds of this type are costly and can not be produced economically on a larger scale. Moreover, the application of colors to Venetian blinds has its limitations. In the first place, it is expensive, especially when coloring material is used which is to withstand protracted exposure to the elements, and secondly in order to keep the cost within reason, each rail and slat could at best be painted with two different colors, one at each of its faces. More attractive ornamentations, such as painted flowers or other configurations, produced by the application of different colors would be prohibitive in cost.

The present invention broadly contemplates the production of highly attractive ornamental Venetian blinds, which, although constructed from originally frail and even weak and inexpensive component parts, will upon completion, in accordance with my invention, constitute structural elements of such strength, ruggedness and lasting quality as is usually required for costly Venetian blinds.

My invention further contemplates the surfacing of Venetian blind parts by means of pliable, ornamental sheet material, which may take the form of either paper or flexible fabrics of all kind.

It is further contemplated that such sheet material is to be suitably ornamented or colored before being used in my surfacing process; that the sheet material is to possess such a small degree of body firmness that it may be easily applied to, and that it will readily shape itself to conform with the contour of a suitable base; that such base is to possess a somewhat greater body firmness than the sheet material; that somewhat prior to associating the sheet material with the base, a suitable adhesive, for intimately securing together the two elements, is applied to the sheet material and is spread over its entire future inner surface area, said adhesive tending to soften and to render still more pliable the sheet material, while the latter is being moved towards the point at which it becomes actually associated with the base; and that such adhesive, when becoming dry, is to stiffen and render the finished, sheet-covered base rigid, strong and serviceable.

My invention further contemplates to so prepare the sheeting before applying it to the base, that it forms one continuous piece of such a shape, width and length that, when first applied, it will completely envelope the body, and will extend beyond the ends of the base, no matter where the edges of the applied sheeting meet in respect to the base, or in which manner or position the sheeting edges are joined, as long as they fully cover the base.

The foregoing objects and other important features of my invention will become more fully understood from the ensuing description of the accompanying drawing, which, although illustrating but one embodiment of my invention, is by no means intended to limit me to the specific structures shown, but on the contrary is to serve for explanatory purposes only.

Figure 1:
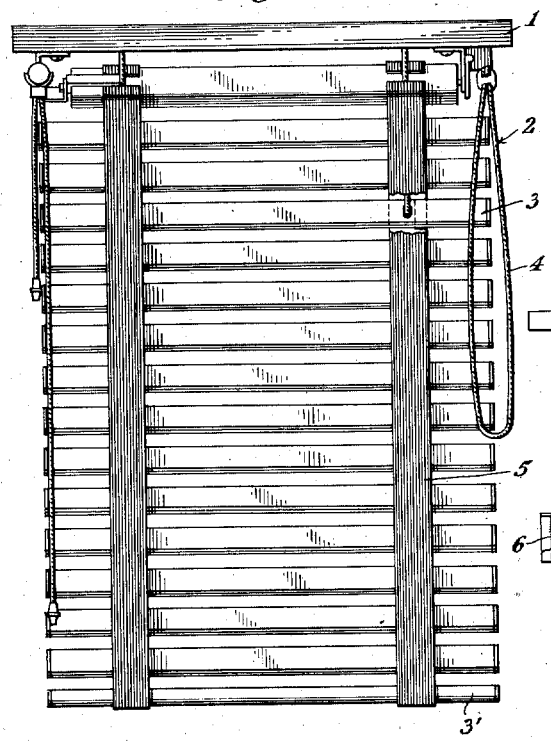
Fig. 1 is an elevation of a Venetian blind constructed according to the present invention.

Referring to the accompanying drawing by numerals, 1 indicates a head rail of the shutter structure 2. Carried by the head rail 1 are a number of shutters or slats 3, a bottom or tilt rail 3', together with actuating cables 4 and supporting straps or bands 5. Each of the shutters 3 is formed with a base 6 which may be of wood, paper, fiber, or other material. However, most of the shutters are made from wood because they are light and yet sufficiently strong to perform the desired result. Heretofore shutters formed of wood or other material have been coated with paint or other coloring matter to present a certain design effect. However, by this method flowers and other configurations could not be provided, except at very great expense.

Figure 3:
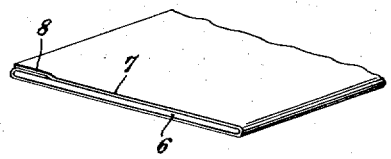
Fig. 3 is a perspective view on an enlarged scale of the shutter shown in Fig. 2.

One of the many possible ways of completely surfacing or enveloping the various parts of Venetian blinds with a pliable sheeting is shown in Fig. 3, where the base 6 is covered with a paper or textile fabric covering 7 which is overlapped at 8 adjacent one of the longitudinal edges of base 6. The covering 7, while preferably of fabric, may be made from any other flexible sheet material, and consequently when the expression "fabric" is used it will be understood that these other elements are equivalent.

Figure 5:
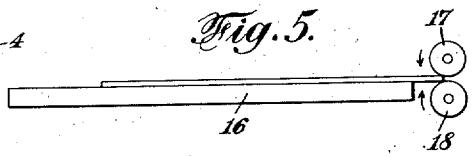
Fig. 5 is a side view illustrating how the wrapped shutter base is passed through squeezing rollers.
Figure 6:
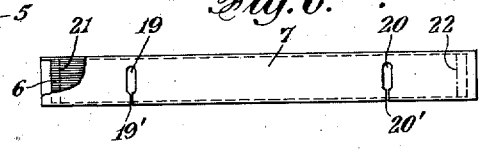
Fig. 6 is a plan view with certain parts broken away of the finished shutter before the ends have been cut or trimmed.
Figure 4:
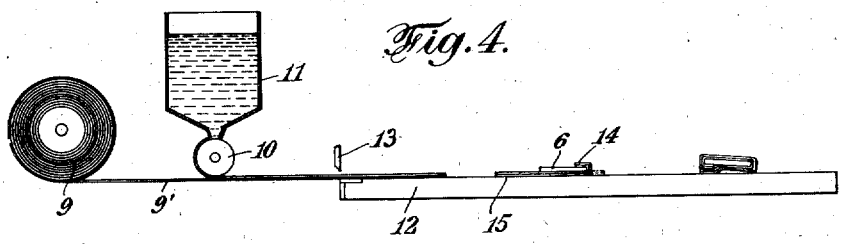
Fig. 4 is a diagram partly in section illustrating part of the method of applying a covering to a shutter base.

In Figs. 4 to 6 diagrams have been presented illustrating the method of manufacturing or producing the complete shutter as shown in Fig. 3. As illustrated in Fig. 4, there is provided a supply of slat covering material in the form of sheeting or fabric 9 which is preferably slightly wider than the base 6 is long. This sheeting is passed beneath an adhesive applying roller 10 which receives adhesive from the container 11 and applies the same to one, preferably the future interior surface of the fabric 9'. After the latter passes the adhesive applying roller 10 it moves on to a table 12 and when a desired length or section is on the table 12 the knife 13 functions to sever the sheeting. The severed section is then moved forwardly a short distance and a base 6 applied thereto near one edge. The edge 14 of the sheeting is then turned over the edge of the base, and then the base is turned over against sheeting portion 15 to overlap edge 14 as illustrated at the extreme right in Fig. 4.

Figure 2:
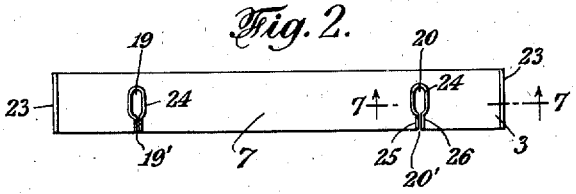
Fig. 2 is a plan view of one of the complete shutters shown in Fig. 1.

The work on table 12 is done by hand, and after the base 6 has been completely wrapped, as just described, it is placed on a table 16 and then fed between squeezing rollers 17 and 18 which press the coated fabric tightly against the base and also press the overlapped edges 8 together. Rollers 17 and 18 are preferably formed of rubber or other resilient material. After the wrapped base has passed the squeezing rollers 17 and 18, it is set aside until the adhesive has completely dried. The unfinished shutter is then taken to a suitable machine for cutting the cable slots 19 and 20. It will be noted that the cutter, in forming the slots 19 and 20, cuts through the fabric as well as the base 6. After this has been done the ends are trimmed off so that the finished shutter, as shown in Fig. 2, will be of the desired length. Preferably the ends are cut off by a suitable saw along the respective lines 21 and 22.

While the aforedescribed steps of my method are intended to explain the production of slats of the construction illustrated, it is self-evident that the overlap of the covering may be arranged at a place remote from the edge of the base, and that the overlapping edges may be located either at the middle of the finished slat, or may be arranged diagonally thereto, or may be located right at the edge of the base.

In any event the slat covering is made of one continuous piece of material, the width of which is originally greater than the length of the slat, and it completely envelopes the slat body and extends beyond its end until both the slat body and its covering material are trimmed together to the proper size.

Another important feature of my invention, directly resulting from my process, is the superior structural characteristics of the finished product. The base, made from relatively inexpensive, infirm material, such as thin wood, or the like does not in itself possess abundant body strength to successfully resist sagging, bending, twisting or warping, brought about by changing exposure to dampness, moisture and heat. My method is designed to not only reduce the cost of a Venetian blind structure, but to strengthen its essential elements made from relatively weak, cheap materials.

It is quite obvious to any one that paper sheeting, even in two layers, possesses little body firmness. Similarly long, thin, single strips of wood present little assurance of strength. When however such wood strips are completely enveloped by a moisture and heat resisting sheeting of fabric, paper, or other sheet material which intimately adheres with its entire surface area to the entire surface area of the strips, and when the sheeting and the adhesive joining the adjacent surfaces become dry and acquire strength and stiffness of their own, it becomes very clear that the strips are materially strengthened and reinforced by the dried, stiffened covering and the dried adhesive, and that they acquire a rigidity and consequent serviceability, which even expensive slat material does not possess.

It is to be noted as one of the features of my invention that the application of suitable adhesives to the different types of covering material has a twofold purpose. Firstly, the adhesive is intended to soften the covering material so that it will readily shape itself to and exactly acquire the contour of the base; its second function is to draw, while drying, the covering against the surface of the base. This second function is made possible only by reducing the thickness of the adhesive layer to the utmost thinness during the squeezing step of my process, which step incidentally hastens the drying period for the adhesive and the covering.

Figure 7:
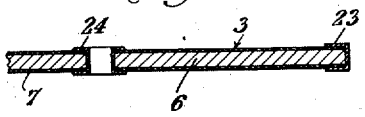
Fig. 7 is an enlarged fragmentary sectional view through Fig. 2 approximately on the line 7—7.

As illustrated particularly in Fig. 7, each of the shutters 3 is provided with a metal cap 23 at each end. This cap may be of the same color as the covering fabric or paper or of a different color, as for instance chromium or silver plated metal. The use of the caps 23 is important in that it not only presents a pleasing appearance but it finishes the ends of the shutters. In cutting the ends along the lines 21 and 22 as shown in Fig. 6 it sometimes occurs that the cutting is more or less irregular and therefore would be objectionable if left uncovered. The caps 23 not only cover the irregular end formation but are squeezed to pinch the shutter and thereby stiffen and strengthen the same.

In addition, the apertures 19 and 20 may be provided with slots 19' and 20' extending to the edge of the shutter. A hollow rivet or eyelet 24 may be arranged in each of the slots 19 and 20. These eyelets have extensions 25 and 26 that protect and reinforce the edges of the radiating slots 19' and 20'. It is to be noted that eyelet portions 25 and 26 extend only to the edge of the shutter but not across the edge. One end of the rivet or eyelet 24 is completed usually before it is applied to the shutter and then the other end is bent over as illustrated in Figs. 2 and 7 so as to grip the shutter and not only protect the raw edges around the slots but act as reinforcing means for the slots. The slots 19' and 20' are desirable in that they will permit a shutter to be completely applied and removed by pulling the cable through the slot. For instance, if a shutter should become broken at some point intermediate the ends of the blind, it could be quickly removed and a new one substituted without dismantling or wtihout even taking the blind from its supports. Also all of the shutters could be removed and sent back to the factory to have new coverings placed thereon whenever desired. It will be understood that the slots 19' and 20' are slightly less in width than the normal diameter of the supporting cables so that the cables must be compressed slightly in order to be moved through the slots. In this way the shutters are properly held in position until positively moved to a disengaged position.

The preceding matter is chiefly directed towards the production of slats in accordance with my method. Since the structure of a Venetian blind would be incomplete without the top and tilt rails, and inasmuch as these parts of the blind should harmonize in appearance with the slats, it is quite evident that they must be surfaced in a manner similar to that employed in covering the slats. For this reason I prefer to apply over the rail bodies sheeting corresponding to that used upon the slats, and in addition to provide, especially for bottom tilt rail 3', end caps similar to slat caps 23, but correspondingly larger in size.

While the manner of applying sheet covering to the tilt rail is similar to that employed in the surfacing of slats, the head or top rail must be covered differently, since its profile is rather complicated by the provision of a bottom groove for accommodating the actuating cords and some operating mechanism.

*Recapitulation*

In order to obtain satisfactory results by my method of surfacing slats or other elements of Venetian blinds with flexible covering, it is essential that the interior or applied surfaces of the sheeting fully and intimately contact with the entire surfce areas of the base. The formation of air spaces between the covering and the base must be carefully avoided and the adherence of the sheeting to the base must be permanent and perfect. For this reason the adhesive employed in my process must have the properties of not only softening the covering, immediately prior to its application, but must be capable of effecting a strong, smooth adherence between the covering and the base, when squeezed to a minutely thin adhesive layer.

The surfacing material for Venetian blind elements consist, according to my method, of a continuous, one-piece sheeting which completely envelopes the body of the element, and which, upon becoming dry, will form an effective reinforcement for the originally relatively weak-structured base of the element.

The finished product presents a highly attractive, fully self-contained, strong and serviceable article, which will not only resist wear and tear, but which will be unaffected by heat and moisture.

In view of the indicated possible variations which may be followed in my process of surfacing Venetian blind parts, and since due to changing conditions and demands still further modifications may be required, I wish it to be understood that I shall have the right to make changes and improvements to meet such conditions and demands, within the broad scope of the annexed claims.

I claim:

1. An element for Venetian blinds consisting of a relatively solid base covered with a one-piece pliable material, an adhesive coating applied to the inner face of the material, said material completely enveloping and snugly and intimately adhering to the full contour of the base, and wherein said base, although being solid, lacks in structural firmness, and wherein said pliable material and the adhesive coating, when dry, constitute a substantial reinforcement for the base when the element is in its finished state.

2. A Venetian blind element having a base member made of a relatively solid but comparatively weak material, a pliable substantially sheet-like one-piece ornamental covering applied to the wall sides of the base member and intimately united thereto by an adhesive, which latter softens the covering to make a tight wrap and tends to stiffen the blind element when dried.

LEWIS I. KAHN.